United States Patent [19]

Buehler et al.

[11] Patent Number: 5,128,294
[45] Date of Patent: Jul. 7, 1992

[54] PROPYLENE POLYMERIZATION CATALYST AND METHOD

[75] Inventors: Charles K. Buehler, Naperville; Cindy S. Senger, Plainfield; Kenneth W. Johnson, Naperville, all of Ill.

[73] Assignee: Quantum Chemical Corporation, Cincinnati, Ohio

[21] Appl. No.: 341,242

[22] Filed: Apr. 20, 1989

Related U.S. Application Data

[63] Continuation of Ser. No. 71,978, Jul. 10, 1987, abandoned.

[51] Int. Cl.⁵ .............................................. C08F 4/649
[52] U.S. Cl. ...................... 502/111; 502/104; 502/125; 502/127; 526/128; 526/142
[58] Field of Search .............. 502/104, 111, 125, 127

[56] References Cited

U.S. PATENT DOCUMENTS

| | | | |
|---|---|---|---|
| 3,412,174 | 11/1968 | Kroll | 260/683.9 |
| 3,701,763 | 10/1972 | Wada et al. | 260/88.2 |
| 3,769,233 | 10/1973 | Hermans et al. | 252/429 |
| 3,825,524 | 7/1974 | Wada et al. | 260/93.5 |
| 3,850,899 | 11/1974 | Wada et al. | 260/88.2 |
| 3,984,350 | 10/1976 | Karayannis et al. | 252/429 |
| 4,028,481 | 6/1977 | Shiomura et al. | 502/127 X |
| 4,048,415 | 9/1977 | Matsuzawa et al. | 526/119 |
| 4,060,593 | 11/1977 | Kazuo et al. | 423/492 |
| 4,107,414 | 8/1978 | Giannini et al. | 502/125 X |
| 4,110,248 | 8/1978 | Sandis et al. | 252/429 |
| 4,115,532 | 9/1978 | Yamaguchi et al. | 423/492 |
| 4,115,533 | 9/1978 | Yamaguchi et al. | 423/492 |
| 4,135,045 | 1/1979 | Matsuzawa et al. | 526/114 |
| 4,142,991 | 3/1979 | Arzoumanidis et al. | 252/429 |
| 4,183,826 | 1/1980 | Ueno et al. | 252/429 |
| 4,186,240 | 1/1980 | Matsuda et al. | 525/240 X |
| 4,192,774 | 3/1980 | Kortbeek et al. | 252/429 |
| 4,200,717 | 4/1980 | Abe et al. | 526/159 |
| 4,207,205 | 6/1980 | Wristers | 252/429 |
| 4,210,729 | 7/1980 | Hermans et al. | 525/247 |
| 4,210,735 | 7/1980 | Hermans et al. | 526/119 |
| 4,210,736 | 7/1980 | Baekelmans et al. | 526/142 |
| 4,210,738 | 7/1980 | Hermans et al. | 526/152 |
| 4,211,852 | 7/1980 | Matsuda et al. | 428/523 X |
| 4,229,318 | 10/1980 | Mueller-Tamm et al. | 252/429 |
| 4,235,745 | 11/1980 | Takahashi et al. | 252/429 |
| 4,242,229 | 12/1980 | Fujii et al. | 252/429 |
| 4,246,135 | 1/1981 | Shiga et al. | 252/429 |
| 4,258,161 | 3/1981 | Kakogawa et al. | 526/153 |
| 4,260,710 | 4/1981 | Staiger et al. | 526/142 |
| 4,288,579 | 9/1981 | Miyoshi et al. | 526/124 |
| 4,296,222 | 10/1981 | Staiger et al. | 526/119 |
| 4,305,920 | 12/1981 | Hasuo et al. | 423/492 |
| 4,357,452 | 11/1982 | Kakogawa et al. | 526/139 |
| 4,382,018 | 5/1983 | Allan et al. | 502/127 X |
| 4,385,160 | 5/1983 | Jaggard et al. | 526/139 |
| 4,385,162 | 5/1983 | Jaggard et al. | 526/142 |
| 4,433,073 | 2/1984 | Sano et al. | 524/518 X |
| 4,444,967 | 4/1984 | Arzoumanidis et al. | 526/114 |
| 4,463,102 | 7/1984 | Foerster | 502/127 |
| 4,471,064 | 9/1984 | Buehler | 502/108 |
| 4,471,065 | 9/1984 | Buehler et al. | 502/108 |
| 4,482,638 | 11/1984 | Fries | 502/108 |
| 4,526,944 | 7/1985 | Staiger | 526/142 |
| 4,529,780 | 7/1985 | Foerster | 526/142 |
| 4,668,753 | 5/1987 | Kashiwa et al. | 526/348 |

*Primary Examiner*—Patrick P. Garvin
*Attorney, Agent, or Firm*—Marshall, O'Toole, Gerstein, Murray & Bicknell

[57] ABSTRACT

A catalyst component useful in propylene polymerization in combination with a dialkyl aluminum halide cocatalyst comprises the product of reaction of $TiCl_3$ which is substantially free of extraneous halide with a selected electron donor compound which is dissolved in a liquid hydrocarbon solvent in which the $TiCl_3$ is dispersed. The electron donor compound is selected from certain organic acid esters, hindered phenolic compounds and silyl esters.

The catalyst of the invention provides increased activity, molecular weight control, increased isotacticity of propylene polymer products and prevents catalyst feed line pluggage, among other advantages.

30 Claims, No Drawings

PROPYLENE POLYMERIZATION CATALYST AND METHOD

This application is a continuation, of application Ser. No. 07/71,978, filed Jul. 10, 1987 and now abandoned.

BACKGROUND OF THE INVENTION

1. Field of the Invention

This invention relates generally to olefin polymerization catalysts and methods and, more particularly, this invention relates to a catalyst component and system useful in the polymerization of propylene.

2. Description of Related Art

It is well known that propylene can be polymerized using catalysts containing titanium trichloride in any of a variety of forms in combination with an organoaluminum compound. The polymer products, while predominantly crystalline, contain amorphous and low molecular weight components. In order to obtain a commercially useful polypropylene product, it is desirable to minimize levels of such amorphous and low molecular weight components in the product. The presence of these components leads to processing difficulties in the fabrication of products from the polymers, and the finished products are typically inferior in terms of their physical properties.

When some 1-olefin polymerization reactions are carried out in a hydrocarbon medium, low molecular weight material remains in the solvent and can readily be separated from the product. In bulk and gas phase processes, however, it is desirable to have catalysts which provide superior stereoregularity to eliminate the need to remove low molecular weight materials, and to minimize the presence of amorphous species in polypropylene products.

One approach to eliminating or reducing these problems is by means of modification of catalyst components. While a wide variety of catalyst modifiers are known in the art, care must be exercised in the selection and use of modifiers because reduction in levels of low molecular weight and amorphous by-products is typically accompanied by decreases in catalyst activity and polymerization rate. Accordingly, an effective catalyst modifier would be one which minimizes the production of amorphous and low molecular weight by-products without decreasing the activity of the catalyst system.

In some propylene polymerization plants, liquid propylene monomer is used to flush the catalyst into the reactor. Many high activity titanium catalysts can polymerize propylene even in the absence of a cocatalyst either cationically due to the presence of Lewis acid components or by a coordination mechanism due to the presence of aluminum alkyl residues from the catalyst preparation procedure. In an industrial continuous polymerization unit, this can lead to polymerization in the feed lines which can result in plugging and other catalyst feed problems. Thus, it would be desirable to provide a catalyst system with which polymerization in feed lines is inhibited prior to introduction to the reaction system.

One example of catalyst modification for the preparation of 1-olefin polymers, including propylene polymers, is disclosed in Staiger et al. U.S. Pat. No. 4,260,710 (Apr. 7, 1981). This patent discloses 1-olefin polymerization catalysts containing titanium trichloride which is milled together with an electron donor compound before use, alkyl aluminum compounds and certain phenolic compounds. It is disclosed that when the phenolic compounds are premixed with the alkyl aluminum compound and used as a catalyst modifier the polymerization rate of the catalyst is improved while minimizing the amount of alkane soluble by-products.

Another catalyst modification proposal is disclosed in Mueller-Tamm et al. U.S. Pat. No. 4,229,318 (Oct. 21, 1980) which discloses 1-olefin polymerization catalysts containing titanium trichloride, an alkyl aluminum compound and carboxylic acid esters. This patent discloses that an improved catalyst is produced by ballmilling a solid titanium trichloride compound with a carboxylic acid ester. Such modification is disclosed to improve the polymerization rate of the catalyst while maintaining the amount of alkane soluble by-products at a minimum. However, this method requires high capital investment in ballmilling equipment and the polymer produced with this catalyst is irregular in shape with a high concentration of fines, which causes synthesis and downstream problems.

In the Mueller-Tamm et al. patent, the titanium trichloride compound must be complexed with aluminum trichloride. In Staiger et al., the titanium trichloride may be free of aluminum trichloride but need not be.

SUMMARY OF THE INVENTION

It is an object of the invention to overcome one or more of the problems described above.

According to the present invention, a catalyst component useful in combination with a dialkyl aluminum halide cocatalyst in propylene polymerization comprises the reaction product of titanium trichloride which is substantially free of extraneous halide with a selected electron donor compound which is dissolved in a hydrocarbon in which the titanium trichloride is dispersed.

The electron donor compound is selected from groups of organic acid esters, hindered phenolic compounds and silyl esters.

Preferably, the titanium trichloride is substantially pure and no expensive, time-consuming ballmilling procedures are necessary.

The invention also comprehends a catalyst system comprising the combination of the inventive catalyst component with a dialkyl aluminum halide cocatalyst, which may or may not be mixed with a phenolic compound, a method of preparing a catalyst component, and a method of homopolymerizing or copolymerizing propylene using the catalyst system.

According to the invention, solid crystalline polypropylene having improved isotacticity and a lower proportion of low molecular weight materials is obtained with a catalyst system exhibiting improved productivity. In at least one embodiment of the invention premature polymerization is inhibited.

Other objects and advantages of the invention will be apparent to those skilled in the art from the following detailed description taken in conjunction with the appended claims.

DETAILED DESCRIPTION OF THE INVENTION

According to the invention, a catalyst system containing a modified titanium trichloride catalyst component achieves one or more of the following objectives:

To provide a catalyst system which produces homopolymers and copolymers (including terpolymers) of propylene (where propylene is the major component)

with high stereoregularity at high reaction temperatures, for example at 80°-90° C.;

To provide a catalyst system which can provide increased productivity;

To provide a catalyst system which produces polymer products with uniform particle size distribution, good spherical morphology and high bulk density; these features allow increased production rates in polypropylene plants;

To provide a catalyst system which requires no time-consuming, expensive ballmilling preparation step;

To provide a catalyst system which results in polymer with low halogen content; this can be achieved by increasing the polymer yield per unit weight of catalyst and/or by eliminating extraneous halogen containing components such as aluminum chloride in the catalyst;

To provide a catalyst system which is readily amenable to molecular weight control by hydrogen;

To provide a catalyst system which retains a constant or relatively constant maximum activity over a long time period; this is especially pertinent in two-stage polymerization processes; and To provide a catalyst system which is simple and safe to prepare and easy to handle.

According to the invention, a catalyst component is prepared by treating extraneous halide-free TiCl$_3$ with an electron donor modifier. The TiCl$_3$ catalyst component is useful in combination with a dialkyl aluminum halide compound co-catalyst in propylene homopolymerization and copolymerization (including terpolymerization).

The inventive catalyst component comprises the product of reaction of the substantially extraneous halide-free TiCl$_3$ with an electron donor compound which is dissolved in a liquid hydrocarbon solvent in which the TiCl$_3$ is dispersed.

The TiCl$_3$ may be substantially pure and, if desired, may be present in the form of highly regular spherical particles or other controlled spherical morphology since no ballmilling or other milling step is required. TiCl$_3$ particles typically are of 10 to 100 microns in diameter. The TiCl$_3$ modification reaction may be carried out at any convenient temperature from about 0° to 100° C. and is preferably carried out at ambient temperature.

The electron donor compound is a selected organic acid ester, hindered phenolic compound or silyl ester, and is preferably present in a molar ratio with respect to TiCl$_3$ in the range of about 0.05 to 5:1, preferably less than 1:1.

Useful organic acid esters have the general formula

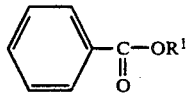

wherein R$^1$ is an alkyl group of 1 to 16 carbon atoms, inclusive.

Preferred organic acid esters include ethyl benzoate, propyl benzoate and butyl benzoate.

Useful hindered phenolic compounds have the general formula

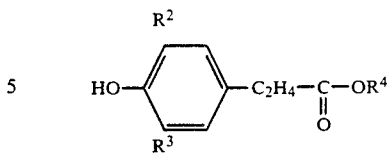

wherein R$^2$ is an alkyl group of 1 to 6 carbon atoms, inclusive; R$^3$ is hydrogen or an alkyl group of 1 to 6 carbon atoms, inclusive; and R$^4$ is an alkyl group of 2 to 24 carbon atoms, inclusive.

A preferred hindered phenolic compound modifier is n-octadecyl-4-hydroxy-3,5-ditertbutyl phenyl propionate.

Useful silyl esters have the general formula

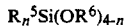

wherein R$^5$ and R$^6$ can be the same or different and are alkyl groups of 1 to 8 carbon atoms, inclusive, or aryl groups, and n=1 or 2.

A preferred silyl ester is isobutyl trimethoxy silane.

As stated above, the TiCl$_3$/electron donor modifier reaction is carried out without a milling step with TiCl$_3$ dispersed in a hydrocarbon solution of the electron donor. Useful hydrocarbon solvents include alkanes and cycloalkanes having 4 to 20 carbon atoms, inclusive. Heptane is preferred. The modified TiCl$_3$ catalyst component can be used immediately after contact with the modifier or contact may be maintained for up to several days.

The polymerization reaction may be carried out in slurry form by contact with the hydrocarbon dispersion of the modified TiCl$_3$ component or the component can be separated from the hydrocarbon slurry and used in gas phase, slurry or liquid pool types of polymerization processes.

Selection of the electron donor modifier and the TiCl$_3$ to modifier ratio can provide a catalyst component having specific desired features of the invention which include increased reactivity, ability to modify polymer molecular weight, improved product isotacticity even at elevated polymerization temperatures, and elimination of feed line pluggage when the catalyst is fed to the reactor with propylene, among other advantages.

The modified TiCl$_3$ component is active in propylene homopolymerization and copolymerization in combination with a dialkyl aluminum halide cocatalyst compound of the formula R$_2^7$AlX where R$^7$ is an alkyl group having 1 to 20 carbon atoms, inclusive, and X is a halogen atom. R$^7$ preferably has 2 to 4 carbon atoms, and X is preferably chlorine. The cocatalyst preferably comprises diethylaluminum chloride, which may be mixed with a trialkyl aluminum compound, if desired. Furthermore, the cocatalyst compound may be present in admixture with a phenolic compound, such as those disclosed to be useful for this purpose in Staiger, et al. U.S. Pat. No. 4,260,710, the disclosure of which is incorporated herein by references. This has been found to increase activity.

The molar ratio of cocatalyst compound to TiCl$_3$ should be in the range of about 1 to 50, with a ratio in the range of about 3.5 to 12 preferred.

Propylene polymerization may be carried out according to the invention in any suitable type of reactor which is otherwise useful in propylene polymerization at any suitable temperature and pressure. As used herein, the term "propylene polymerization" is intended to denote both propylene homopolymerization and copolymerization (including terpolymerization) with at least one 1-olefin having two to eight carbon atoms at temperatures from about 0° to 120° C. and at pressures of from about 1 to 60 atmospheres, each variable depending on the specific system.

In gas phase processes, the temperature should range from 0° to 120° C., with 60°-100° C. preferred. The pressure should range from 1 to 60 atm., with 20-40 atm. preferred. Typical reaction conditions are exemplified by a temperature of 80° to 90° C. and a pressure of 25 to 35 atm.

In slurry polymerization, wherein catalyst and product particles are dispersed in a liquid hydrocarbon diluent (which may be the solvent in which the catalyst is prepared) may be carried out at temperatures of 0° to 90° C. (60°-90° C. preferred) and pressures of 1 to 20 atm. (at least 10 atm. preferred).

Liquid pool polymerization, wherein the catalyst and product particles are dispersed in liquid monomer or a mixture of comonomers, is typically carried out at temperatures of 0° to 90° C. (60° to 90° C. preferred) and at pressures sufficiently high to maintain the monomer(s) in a liquid state, e.g. 1 to 60 atm., with 20 to 40 atm. preferred.

One feature of the invention is that highly stereoregular, isotactic propylene polymers may be obtained at elevated reaction temperatures (e.g. 80° to 90° C.) without a loss in productivity.

Products of the inventive polymerization method include propylene homopolymers and random copolymers of propylene with other 1-olefins, and terpolymers, where propylene is the predominant constituent of the product. Multistage polymerization methods are also possible.

EXAMPLES

The following specific examples are provided in order to clearly illustrate the practice of the invention but are not to be considered to limit the scope of the invention in any way.

In the following examples, a number of gas phase propylene polymerization reactions were conducted using a diethylaluminum chloride cocatalyst and a titanium trichloride compound. The cocatalyst/TiCl₃ molar ratios are identified in each example as are other catalyst preparation and reaction variables such as concentrations, orders of addition and aging times.

Unless otherwise indicated, polymerization reactions were carried out over a period of two hours in a 1 liter reactor at a temperature of 87° C. under a total reaction pressure of 28 or 31 atm. (identified in each example). The hydrogen concentration used to regulate the molecular weight of product polymer was 0.0133 M unless otherwise stated. Heptane was used as the catalyst preparation solvent.

Following each polymerization reaction, the product polymer was exposed to air, dried and weighed. Productivity is reported as grams of solid polymer per gram of modified $TiCl_3$ catalyst component (i.e. excluding cocatalyst) per two hours of reaction time. Isotacticity was determined by Soxhlet extraction of a portion of the solid polymer with heptane.

Melt flow rate (MFR) was determined according to ASTM procedure D1238-82. MFR is a measure of molecular weight and is reported as g/10 min. Bulk density (BD) was determined by weighing a tared graduated cylinder of known volume (18.3ml) filled with polymer. Net polymer weight was then converted to $lb/ft^3$ to arrive at the bulk density.

Example 1 (Comparative)

In this example, the titanium trichloride catalyst component was unmodified. Propylene homopolymerization was carried out at 80° and 87° C. This example illustrates how increasing the reaction temperature from 80° to 87° C. adversely affects the tacticity of polypropylene made from an unmodified titanium trichloride catalyst. The polymer product obtained at 87° C. was sticky and reactor stirring was slow. In a continuous polymerization unit this would cause a shutdown.

Comparison with polymerization using the inventive catalyst at 87° C. in the following example shows the greatly improved isotacticity obtainable and the ability to operate at increased temperature without loss of isotacticity or productivity.

TABLE 1

| | Effect of Temperature on Unmodified Catalyst | | | |
|---|---|---|---|---|
| Run | Reaction Temp (°C.) | Productivity (g/g/2 hr.) | Isotacticity (%) | MFR (g/10 min.) | BD (lbs/ft³) |
| 1 | 80 | 3012 | 98.0 | 1.3 | 26.8 |
| 2 | 87 | 2750 | 93.0 | 3.8 | 27.0 |

Reactor Conditions: 28 atm. propylene pressure. 0.03 g of titanium trichloride catalyst component was used at a 10/1 diethyl aluminum chloride/titanium trichloride molar ratio.

Example 2

In this example, $TiCl_3$ was modified by reaction with butyl benzoate. The molar ratio of titanium to butyl benzoate in each case is shown in Table 2.

This example illustrates (runs 2-4) that both productivity and isotacticity of product propylene homopolymer is increased with increasing concentrations of modifier relative to titanium, up to a maximum above which a slight decrease was exhibited (run 4). However, in all cases the productivity and isotacticity values were substantially superior to those of comparison run 1 in which the $TiCl_3$ was unmodified.

TABLE 2

| | Effect of Contacting Modifier with Solid Catalyst on Activity and Isotacticity | | | | |
|---|---|---|---|---|---|
| Run | TiCl₃/Modifier Mole Ratio | Productivity (g/g/2 hr.) | Isotacticity (%) | MFR (g/10 min) | BD (lb/ft³) |
| 1 (control) | — | 2750 | 93.0 | 3.8 | 27 |
| 2 | 1.0/0.26 | 4460 | 97.3 | — | — |
| 3 | 1.0/0.33 | 5475 | 97.5 | 3.0 | 25.6 |
| | | 5475 | 96.6 | — | — |

TABLE 2-continued

| | Effect of Contacting Modifier with Solid Catalyst on Activity and Isotacticity | | | | |
|---|---|---|---|---|---|
| Run | TiCl$_3$/Modifier Mole Ratio | Productivity (g/g/2 hr.) | Isotacticity (%) | MFR (g/10 min) | BD (lb/ft$^3$) |
| 4 | 1.0/0.40 | 5200 | 96.4 | 3.8 | 26.0 |

Reaction Conditions: 31 atm. propylene pressure with hydrogen adjusted from 0.0089–0.011 mol to the reactor to obtain a 3.0 melt flow resin. The cocatalyst/titanium molar ratio was 6.5/1 with diethyl aluminum chloride as the cocatalyst.

Example 3

This example illustrates the effect of modifying TiCl$_3$ with the n-octadecyl ester of 4-hydroxy-3,5-ditertbutyl phenyl propionic acid. In control run 1 no modifier was used. In runs 2 and 3 the phenolic modifier was added to the diethylaluminum chloride cocatalyst as described in Staiger, et al. U.S. Pat. No. 4,260,710, but TiCl$_3$ was not modified. In runs 4 and 5 the phenolic modifier was reacted with solid TiCl$_3$ according to the invention.

It can be seen from Table 3 that modification of solid TiCl$_3$ with a hindered phenolic compound according to the invention provides a catalyst of superior activity as compared to addition of the phenolic compound to the cocatalyst. Also, melt flow rate is higher for the inventive catalyst.

TABLE 3

| | Effect of Contacting Solid Titanium Trichloride with Phenolic Compound and Aging Said Mixture | | | | |
|---|---|---|---|---|---|
| Run | Age Time (Days) | TiCl$_3$/Modifier Mole Ratio | Productivity (g/g/2 hr.) | Isotacticity (%) | MFR (g/10 min) |
| 1 (control) | — | no modifier | 2750 | 93 | 3.8 |
| 2 (control) | — | 1.0/0.5 | 4100 | 97.9 | 3.2 |
| 3 (control) | — | 1.0/0.5 | 4100 | 95.7 | 3.3 |
| 4 | Immediate after mixing | 1.0/.55 | 5070 | 96.3 | 7.7 |
| 5 | 2 days | 1.0/0.5 | 4800 | 94.9 | 5.0 |

Reaction Conditions: 28 atm. propylene pressure with 0.013 moles/liter of hydrogen for molecular weight control. In all cases the aluminum alkyl to titanium molar ratio was 7:1 using diethylaluminum chloride as the cocatalyst.

Example 4

Table 4, below, demonstrates the results of modifying the solid TiCl$_3$ catalyst component with a silyl ester, in comparison with modification by use of two organic acid esters of the invention. In each case, n-octadecyl-4-hydroxy-3,5-ditertbutyl phenyl propionate was mixed with the cocatalyst, at a phenolic/cocatalyst molar ratio of 0.5/10.

Example 5

Table 5, below, shows the results of contacting liquid propylene with TiCl$_3$ modified according to the invention as compared to an unmodified TiCl$_3$ catalyst component in the absence of added aluminum alkyl cocatalyst. This example shows that modification of TiCl$_3$ with organic esters inhibits polymerization in the absence of the cocatalyst.

When unmodified solid TiCl$_3$ was contacted with liquid propylene for one hour at 87° C. and 31 atm., some polymer was obtained. When the TiCl$_3$ had been modified with an organic acid ester according to the invention, essentially no polymerization was obtained in the absence of the cocatalyst.

This example demonstrates how the problem of polymerization in catalyst feed lines wherein catalyst is fed to a reactor with liquid monomer can be eliminated by use of a catalyst made according to the invention wherein the catalyst is introduced to the reactor separately from the cocatalyst. Thus this can be conveniently carried out by flushing with liquid propylene monomer.

TABLE 4

| | Effect of Silyl Ester Modifier | | |
|---|---|---|---|
| Modifier Added to Catalyst | Productivity (g/g/2 hr.) | MFR (g/10 min) | Isotacticity (%) |
| Butyl Benzoate | 5345 | 3.6 | 96.8 |
| | 5850 | 9.7 | 95.6 |
| Propyl Benzoate | 5535 | 3.8 | 96.5 |
| Isobutyl Trimethoxy Silane | 5255 | 7.7 | 95.4 |
| | 6200 | 9.6 | 96.7 |

Reactor pressure 31 atm. The modifier to titanium molar ratio was 0.15/1.

TABLE 5

| Effect of Electron Donors on Inhibiting Polymerization in the Absence of Added Aluminum Alkyl | |
|---|---|
| Modifier | Grams Polypropylene/Gram Catalyst Component |
| None | 11 |
| Butyl Benzoate | <1 |
| Propyl Benzoate | <1 |
| Ethyl Benzoate | <1 |

Solid titanium trichloride catalyst component was treated with 0.25 moles of modifier per mole of titanium, then liquid propylene was introduced to the catalyst and allowed to react for one hour. The propylene was vented and the residue weighed.

The foregoing detailed description is given for clearness of understanding only, and no unnecessary limitations should be understood therefrom, as modifications within the scope of the invention will be obvious to those skilled in the art.

What is claimed:

1. A catalyst component useful in combination with a dialkyl aluminum halide cocatalyst in propylene polymerization, said catalyst component being substantially free of extraneous halide and prepared by a method consisting essentially of the step of reacting reactants consisting essentially of unmilled TiCl$_3$ which is substantially free of extraneous halide and an electron donor compound dissolved in a liquid alkane or cycloalkane solvent containing substantially no olefin in which said TiCl$_3$ is dispersed without a milling step whereby said TiCl$_3$ is modified, said electron donor being selected from the group consisting of:
  (a) organic acid esters of the general formula
      wherein R$_1$ is an alkyl group of 1 to 16 carbon atoms, inclusive;
  (b) hindered phenolic compounds of the general formula

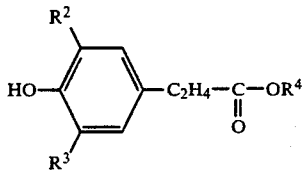

wherein R$^2$ is an alkyl group of 1 to 6 carbon atoms, inclusive; R$^3$ is hydrogen or an alkyl group of 1 to 6 carbon atoms inclusive; and R$^4$ is an alkyl group of 2 to 24 carbon atoms, inclusive; and
  (c) silyl esters of the general formula $R_n{}^5Si(OR^6)_{4-n}$ wherein R$^5$ and R$^6$ can be the same or different and are alkyl groups of 1 to 8 carbon atoms, inclusive, or aryl groups, and n=1 or 2.

2. The catalyst component of claim 1 wherein said TiCl$_3$ is substantially pure.

3. The catalyst component of claim 1 wherein the reaction between said TiCl$_3$ and said electron donor compound is carried out at a temperature of about 0° to 100° C.

4. The catalyst component of claim 3 wherein said reaction is carried out at ambient temperature.

5. The catalyst component of claim 1 wherein the molar ratio of said electron donor compound to said TiCl$_3$ is in the range of about 0.05 to 5:1.

6. The catalyst component of claim 1 wherein said electron donor compound is an organic acid ester of (a) selected from the group consisting of ethyl benzoate, propyl benzoate and butyl benzoate.

7. The catalyst component of claim 1 wherein said electron donor compound is a hindered phenolic compound of (b) comprising n-octadecyl-4-hydroxy-3,5-ditertbutyl phenyl propionate.

8. The catalyst component of claim 1 wherein said electron donor compound is a silyl ester of (c) comprising isobutyl trimethoxy silane.

9. The catalyst component of claim 1 wherein said solvent has 4 to 20 carbon atoms, inclusive.

10. The catalyst component of claim 1 wherein said TiCl$_3$ is in the form of substantially spherical particles.

11. A catalyst system comprising the catalyst component of claim 1 in combination with a cocatalyst comprising a compound of the formula R$_2{}^7$AlX where R$^7$ is an alkyl group of 1 to 20 carbon atoms, inclusive and X is a halogen atom.

12. The catalyst system of claim 11 wherein R$^7$ is an alkyl group of 2 to 4 carbon atoms, inclusive.

13. The catalyst system of claim 11 wherein X is chlorine.

14. The catalyst system of claim 11 wherein the molar ratio of said cocatalyst compound to said TiCl$_3$ is in the range of about 1 to 50:1.

15. The catalyst system of claim 14 wherein said molar ratio is about 3.5 to 12:1.

16. The catalyst system of claim 11 wherein said cocatalyst comprises diethylaluminum chloride.

17. The catalyst system claim 11 wherein said cocatalyst compound is mixed with a trialkyl aluminum compound.

18. The catalyst system of claim 11 wherein said cocatalyst compound is mixed with a phenolic compound.

19. A method of preparing a catalyst component useful in combination with a dialkyl aluminum halide catalyst in propylene polymerization, said method consisting essentially of the step of reacting reactants consisting essentially of unmilled TiCl$_3$ and an electron donor compound dissolved in a liquid alkane or cycloalkane solvent in which said TiCl$_3$ is dispersed without a milling step whereby said TiCl$_3$ is modified, said reactants being substantially free of extraneous halide, said electron donor compound being selected from the group consisting of:
  (a) organic acid esters of the general formula
      wherein R$^1$ is an alkyl group of 1 to 16 carbon atoms, inclusive;
  (b) hindered phenolic compounds of the general formula
      wherein R$^2$ is an alkyl group of 1 to 6 carbon atoms, inclusive; R$^3$ is hydrogen or an alkyl group of 1 to 6 carbon atoms, inclusive; and r$^4$ is an alkyl group of 2 ro 24 carbon atoms, inclusive; and
  (c) silyl esters of the general formula $R_n{}^5Si(OR^6)_{4-n}$ wherein R$^5$ and R$^6$ can be the same or different and are alkyl groups of 1 to 8 carbon atoms, inclusive, or aryl groups, and n=1 or 2.

20. The method of claim 19 wherein said TiCl$_3$ is substantially pure.

21. The method of claim 19 wherein the reaction between said TiCl$_3$ and said electron donor compound is carried out at a temperature of about 0° to 100° C.

22. The method of claim 21 wherein said reaction is carried out at ambient temperature.

23. The method of claim 19 wherein the molar ratio of said electron donor compound to said TiCl$_3$ is in the range of about 0.05 to 5:1.

24. The method of claim 19 wherein said electron donor compound is an organic acid ester of (a) selected from the group consisting of ethyl benzoate, propyl benzoate and butyl benzoate.

25. The method of claim 19 wherein said electron donor compound is a hindered phenolic compound of (b) comprising n-octadecyl-4-hydroxy-3,5-ditertbutyl phenyl propionate.

26. The method of claim 19 wherein said electron donor compound is a silyl ester of (c) comprising isobutyl trimethoxy silane.

27. The method of claim 19 wherein said solvent has 4 to 20 carbon atoms, inclusive.

28. The method of claim 19 wherein said TiCl$_3$ is in the form of substantially spherical particles.

29. The catalyst component of claim 9 wherein said solvent is heptane.

30. The method of claim 27 wherein said solvent is heptane.

* * * * *